US011415685B2

(12) United States Patent
Clayburn et al.

(10) Patent No.: US 11,415,685 B2
(45) Date of Patent: Aug. 16, 2022

(54) SENSORS CALIBRATION

(71) Applicant: Hewlett-Packard Development Company, L.P., Spring, TX (US)

(72) Inventors: Jody L Clayburn, Vancouver, WA (US); Arthur H Barnes, Vancouver, WA (US); Francisco Javier Gomez Maurer, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 549 days.

(21) Appl. No.: 16/606,614

(22) PCT Filed: Apr. 21, 2017

(86) PCT No.: PCT/US2017/028968
§ 371 (c)(1),
(2) Date: Oct. 18, 2019

(87) PCT Pub. No.: WO2018/194682
PCT Pub. Date: Oct. 25, 2018

(65) Prior Publication Data
US 2020/0182987 A1 Jun. 11, 2020

(51) Int. Cl.
*G01S 7/497* (2006.01)
*G01S 7/4865* (2020.01)
*G01S 17/89* (2020.01)
*G01S 17/00* (2020.01)

(52) U.S. Cl.
CPC .......... *G01S 7/497* (2013.01); *G01S 7/4865* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 4,172,659 A | * | 10/1979 | Laska | G03B 27/80 |
| | | | | 355/83 |
| 4,801,977 A | * | 1/1989 | Ishizaka | G03F 7/70241 |
| | | | | 355/68 |
| 4,960,272 A | | 10/1990 | Wierszewski et al. | |
| 5,139,339 A | * | 8/1992 | Courtney | G01S 17/04 |
| | | | | 250/341.8 |
| 5,767,950 A | * | 6/1998 | Hawver | G03B 27/722 |
| | | | | 355/71 |

(Continued)

FOREIGN PATENT DOCUMENTS

| | | | | |
|---|---|---|---|---|
| CN | 1264033 A | * | 8/2000 | G01S 7/02 |
| CN | 1396883 | | 2/2003 | |

(Continued)

OTHER PUBLICATIONS

Barnes et al: "Determining Printer Media Stack Height Using a Photon Time-of-Flight Sensor", Research Disclosure, 613/68, May 1, 2015 ~ 3 pages.

(Continued)

*Primary Examiner* — Bernarr E Gregory
(74) *Attorney, Agent, or Firm* — HP Inc. Patent Department

(57) ABSTRACT

An apparatus calibrates the optical sensor to calibrate the distance measured by the sensor with the expected distance using a calibration surface at the expected distance.

15 Claims, 8 Drawing Sheets

(56) References Cited

U.S. PATENT DOCUMENTS

| | | | |
|---|---|---|---|
| 6,003,861 A | 12/1999 | Iizumi et al. | |
| 6,140,662 A * | 10/2000 | Lim | B41J 11/0075 250/221 |
| 6,349,936 B1 * | 2/2002 | Muller | G01S 7/526 271/265.01 |
| 6,794,669 B2 * | 9/2004 | Chelvayohan | B41J 11/0095 250/559.4 |
| 7,374,163 B2 | 5/2008 | Cook et al. | |
| 8,246,042 B2 | 8/2012 | Gagnon et al. | |
| 9,024,807 B2 * | 5/2015 | Widahl | G01F 23/284 342/124 |
| 9,069,315 B2 | 6/2015 | Caneza et al. | |
| 2002/0135628 A1 | 9/2002 | Kolodziej | |
| 2010/0148432 A1 * | 6/2010 | Haflinger | B65H 7/14 356/625 |
| 2010/0270733 A1 * | 10/2010 | Freeston | B65H 1/14 271/152 |
| 2011/0261344 A1 * | 10/2011 | De Boer | G01D 3/036 702/167 |
| 2012/0056026 A1 | 3/2012 | Matlin et al. | |
| 2012/0218340 A1 * | 8/2012 | Horikawa | B41J 2/2132 347/19 |
| 2013/0125612 A1 * | 5/2013 | Hays | G01F 25/10 73/1.01 |
| 2014/0098358 A1 | 4/2014 | Koers | |
| 2014/0210899 A1 * | 7/2014 | Barnes | B41J 11/0095 347/19 |
| 2015/0139670 A1 * | 5/2015 | Ahne | B65H 43/06 399/16 |
| 2015/0284195 A1 | 10/2015 | Kushida et al. | |
| 2016/0124089 A1 * | 5/2016 | Meinherz | G01S 7/497 356/5.01 |
| 2016/0347053 A1 | 12/2016 | Kiyokawa | |
| 2017/0050334 A1 | 2/2017 | Aylsworth | |

FOREIGN PATENT DOCUMENTS

| | | |
|---|---|---|
| CN | 103168214 | 6/2013 |
| EP | 985541 A2 | 3/2000 |
| EP | 3015881 | 5/2016 |
| JP | 55157253 | 11/1980 |
| JP | 62156544 | 7/1987 |
| JP | 07311160 | 11/1995 |
| JP | 09113230 | 5/1997 |
| JP | 2003306255 | 10/2003 |
| JP | 2005156380 | 6/2005 |
| JP | 2005529313 | 9/2005 |
| JP | 2012123003 | 6/2012 |
| JP | 2015079211 | 4/2015 |
| WO | WO-2012026943 A2 | 3/2012 |

OTHER PUBLICATIONS

Leuze Electronics: the Sensor People, Apr. 2012 ~ 20 pages http://www.leuze.com/media/.

* cited by examiner

SENSORS CALIBRATION

BACKGROUND

Printing and copying devices are used to produce copies of documents. For example, a printing and copying device may obtain media, such as paper, from a media bin and produce an image and/or text onto the paper. The paper with the printed image and/or text may be provided to an output tray of the printing and copying device so that a user may obtain the printed paper from a common output area. Multiple printed sheets may be produced and provided to the output tray for retrieval by a user. In an example, the printing and copying devices may include sensors in a media bin assembly.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
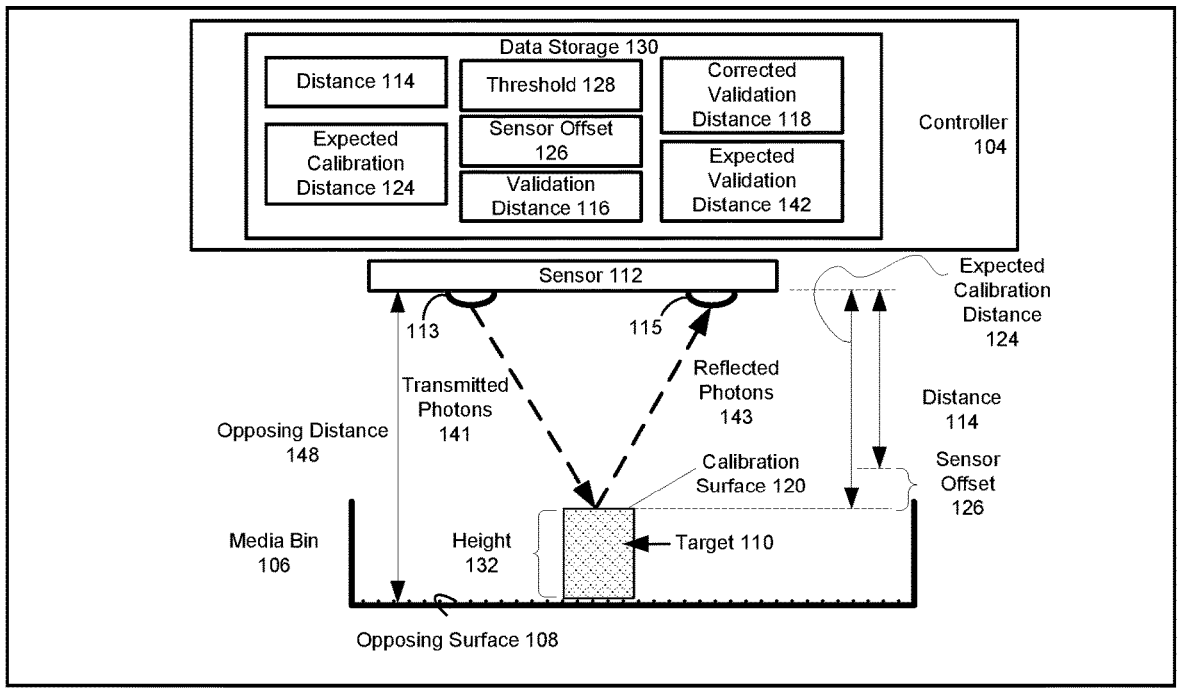
FIG. 1A, FIG. 1B, FIG. 2A, FIG. 2B, FIG. 3A, FIG. 3B, FIG. 4A and FIG. 4B show block diagrams of an example apparatus for calibrating a sensor.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

An apparatus, according to an example of the present disclosure, calibrates a time of flight sensor, hereinafter sensor, in an apparatus to measure distances. In an example, calibration is the alignment of the measured distance between the sensor and the calibration surface with an actual distance between the sensor and the calibration surface, using a sensor offset. In an example, the sensor may be an optical sensor. In another example, the apparatus may be a printing apparatus. In another example, the apparatus may be a media bin assembly. The sensor measures the distance between itself and the calibration surface facing the sensor, for example, by measuring the time it takes for light to travel from a transmitter of the sensor to a receiver of the sensor. In an example, the transmitter and receiver may be co-located, such as located on a same plane and/or part of a single sensor. In an example, the sensor may be described as an optical transceiver.

According to an example of the present disclosure, the sensor is calibrated by measuring a distance to a calibration surface located at an expected calibration distance from the sensor. In an example, the calibration surface may be a cube with the calibration surface facing the sensor, placed on a media bin, of a printing apparatus. In an example, the media bin may be a receptacle for holding print media.

The apparatus of the present disclosure, may calculate a sensor offset, and, for example, the sensor offset may be the difference between the measured distance and the expected calibration distance. The apparatus may measure a validation distance to a validation surface located at an expected verification distance and calculate a corrected validation distance using the sensor offset. According to an example of the present disclosure, when the corrected validation distance is within a threshold, the sensor offset is accurate. Thus, the sensor is calibrated to model actual distance in the apparatus.

The apparatus may detect the presence of a print media on the media bin, absence of print media on the media bin, a height of print media on the media bin, etc. using the sensor, directed toward the media bin. The surface of the media bin facing the sensor may be referred to as an opposing surface of the media bin.

Print media may include a single sheet or multiple sheets of paper or other types of print media. In an example, the media bin may be a tray for collecting the print media after the apparatus produces text and/or images on the print media, such as an output media bin. In an example, the media bin may hold different sizes of the print media. In an example, the media bin may hold print media with a specific gram per square meter thickness (GSM). In another example, the media bin may be an input media bin that holds the print media prior to printing.

In an example, the sensor may be an optical time of flight sensor that determines the distance between the sensor and the surface facing the sensor, such as the opposing surface of the media bin if the media bin is empty, the surface of print media on the media bin or the surface of a target placed on the media bin for calibration. The distance is measured based on the time it takes for photons transmitted from the sensor to be reflected back to the sensor from the surface facing the sensor. The sensor may be an analog time of flight sensor or a digital time of flight sensor. In addition to measuring distance based on time of flight of the photons, the sensor may also measure the number of received photons per unit time. The received photons include the photons reflected from the surface facing the sensor. In another example, the sensor may measure the number of photons reflected per unit time from the surface, such as number of photons transmitted by the sensor and number of those photons received by the sensor. The sensor may use a particular wavelength of light or may transmit photons in a particular pattern to differentiate between photons transmitted and ambient photons. In an example, the sensor may include an ambient light detector. The sensor may include an optical transmitter and an optical receiver.

A technical problem associated with the sensor is calibration of the sensor to accurately measure distances to a calibration surface. For example, the sensor on different printers before calibration may measure the distance between the sensor and the calibration surface, which may vary from the actual distance between the sensor and the calibration surface. The variation in sensor measurements may be due to reflow manufacturing processes, heat, dust, and mechanical tolerances between printer components, such as, tolerance differences between components of the printer housing the sensor and other components of the printer such as the media bin, manufacturing tolerances of the sensor, etc. In an example, two printers in the same assembly line with identical sensors and identical placement of sensors may measure different distances between the sensor and the calibration surface. The apparatus described in further detail below according to examples of the present disclosure is able to calibrate the sensor to determine the sensor offset, which may be used to correct subsequent distance measurements made using the sensor. The corrected distance measurements of the sensor may more accurately model the actual distance between the sensor and the calibration surface.

Another technical problem is associated with calibrating the sensors which may provide discrete measurements, such as a discrete value of distance between the sensor and the calibration surface or a discrete value of time of flight of light between the sensor and the opposing surface. The apparatus described in further detail below according to examples of the present disclosure is able to calibrate the sensors which provide discrete measurements, as opposed to prior calibration methods for analog signals of varying signal intensity. In prior systems, the calibration of analog signal values of prior sensors is achieved by recording the intensity of analog signal values at two extreme points of a range interest and extrapolating analog signal values at intermediate points in the range of interest. In calibration of prior optical sensors, analog signal values are extrapolated, often yielding inaccurate results in the range of interest. Furthermore, in prior sensors, measurement of analog signal values is also not accurate due to prior sensors failing over time, analog signal values varying between different print media, analog signal values varying due to variations of printed material on the print media, etc. Thus, in prior sensors analog signal values may vary even at locations where the prior sensor is calibrated. In contrast, the apparatus according to examples of the present disclosure may be calibrated using a sensor offset, to accurately model the difference between the measured distance and the actual distance. Once calibrated the sensor offset may be used to correct the measured distance throughout the entire range of interest. The sensor offset may be a discrete value and may not be extrapolated. Thus, the calibrated sensor measurements reflect the actual distance between the sensor and the calibration surface, at intermediate points of the range of interest. Also, in an example, the sensor may be calibrated against the calibration surface at locations other than the extreme points of the range.

Furthermore, the apparatus may be able to calibrate the sensor in accordance with present disclosure, as described below.

Figure 1B:
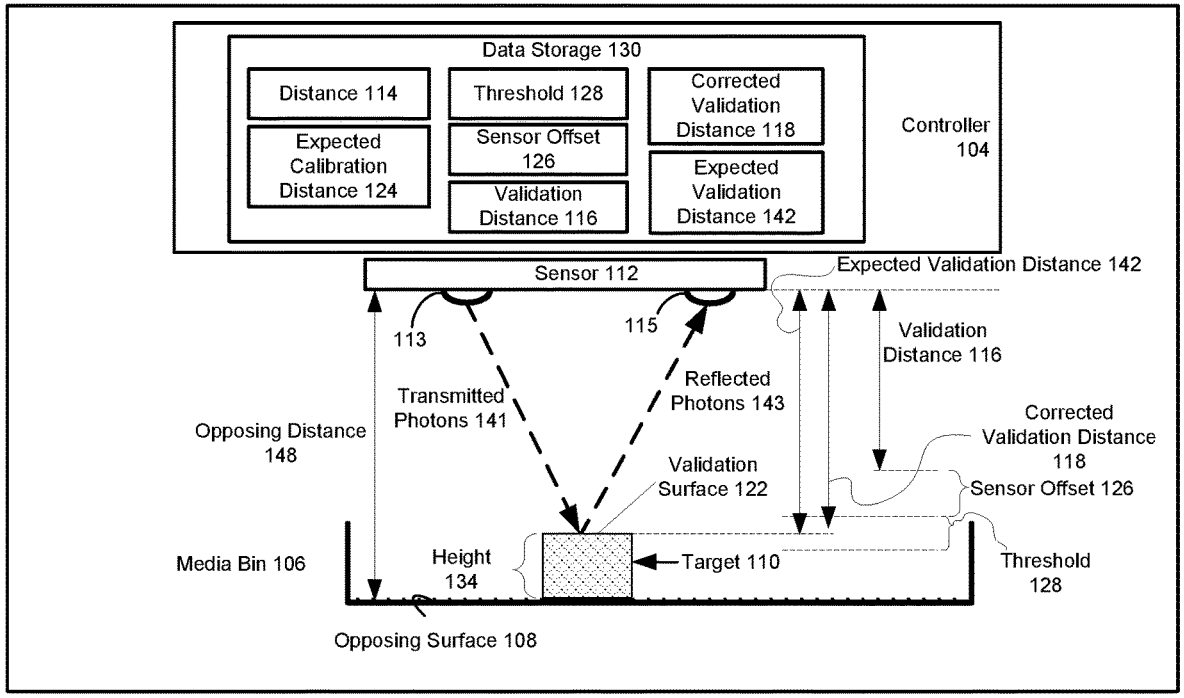

With reference to FIGS. 1A and 1B, these figures show block diagrams of an apparatus 100, according to an example of the present disclosure. The apparatus 100 may include a media bin 106 for holding print media 152. The apparatus 100 may include a controller 104 for controlling a sensor 112. The sensor 112 may be directed toward the media bin 106. For example, the sensor 112 may emit photons toward the media bin 106, shown as transmitted photons 141, and receive reflected photons 143, which are further discussed below. As shown in FIG. 1A, the media bin 106 holds a target 110, such as a target 110 of a known height 132. The target 110 may be placed on an opposing surface 108 of the media bin 106, and the transmitted photons 141 are directed toward the calibration surface 120, such as the surface of the target 110 held on the media bin 106. In other examples described below, the opposing surface 108 of the media bin 106 may be used in place of the target 110 for calibration. The opposing surface of the media bin 106 is shown with ridges to distinguish the opposing surface from other surfaces, but the opposing surface may be flat. The target 110 may be an object of known height.

The controller 104 may measure the distance 114 between the sensor 112 and the calibration surface 120. In an example, the controller 104 may determine the distance 114 based on the time of flight for photons transmitted, i.e., emitted, from the sensor 112 and received back at the sensor 112 after reflection from the calibration surface 120. For example, the reflected photons 143 are photons of the transmitted photons 141 that are reflected back to the sensor 112. The controller 104 may determine the sensor offset 126 based on the distance 114 measured between the sensor 112 and the calibration surface 120 and the expected calibration distance 124. In an example, the expected calibration distance 124 may be based on an opposing distance 148 between the sensor 112 and the opposing surface 108 and the height 132 of the target 110. In an example, the controller 104, may use the sensor offset 126 to correct subsequent distances measured by the sensor 112. In an example, the sensor offset 126 may be written to a register on the sensor 112, to correct subsequent measurements of the sensor 112.

The calibration of the sensor 112 may be verified using a calibration surface of the target 110, as discussed below with reference to FIG. 1B. In an example, the target 110 may be any object a flat surface such as the calibration surface 120, placed on the media bin 106 to reflect the transmitted photons 141 from the transmitter 113 of the sensor 112 as reflected photons 143 toward the receiver 115 of the sensor 112. In an example, the target 110 may have the calibration surface 120 with a known dimension, such as height 132, from an opposing surface of the target 110, such as an opposite side of a cuboid. With reference to FIGS. 1A and 1B, in an example the target 110 may be a cuboid. In another example, as described in detail below the target 110 may be a cube.

With reference to FIG. 1B, there is shown a block diagram of the apparatus 100, according to an example of the present disclosure to verify the calibration of the sensor 112. In an example, the calibration of the sensor 112 may be verified by using a validation surface 122 on the target 110. In an example, the target 110 may have the validation surface 122 with a known dimension, such as height 134, from an opposing surface of the target 110 resting on the media bin 106. To verify the sensor offset 126, the controller 104 may measure the validation distance 116 between the sensor 112 and the calibration surface 120. As described above with reference to FIG. 1A, the controller 104 may determine the validation distance 116 based on the time of flight of photons. In order to determine an accurate measurement of the distance between the sensor 112 and the validation surface 122, the controller 104 may calculate a corrected validation distance 118 using the sensor offset 126. The controller 104 may determine whether the corrected validation distance 118 is within a threshold 128. The controller 104 may determine whether the corrected validation distance 118 is within a threshold 128 by comparing the corrected validation distance 118 to the expected validation distance 142. In an example, the expected validation distance 142 may be based on the opposing distance 148 to the opposing surface 108 of the media bin 106 and the height 134 of the target 110. In an example, the threshold 128 may be a 99% to 101% of the expected validation distance 142. And, based on the comparison the controller 104 may verify the calibration of sensor 112. In an example, the controller 104 may produce an alert when measurements are not accurate after calibration, such as the corrected validation distance 118 being outside the threshold 128. In an example, the alert may indicate a defective alignment of the components of the apparatus. In another example, the alert may indicate a defective sensor or defective component of the apparatus, which may be replaced.

In an example, the difference between the height 132 of the target 110 and the height 134 of the validation target 210 may be more than a minimum effective distance measurement of the sensor 112. In an example, a minimum effective distance measurement of the sensor 112 is the difference between the height of the target 110 and the validation target, where the distance measured by the sensor 112 is different.

In an example, the sensor 112 may be a time of flight sensor. The sensor 112 may include an optical transmitter 113 that can transmit the transmitted photons 141 and a receiver 115 that can receive the reflected photons 143. In an example, the sensor 112 may determine the distance to the calibration surface 120 using a laser transmitter and time of flight of the laser received at a laser receiver on the sensor 112 after reflection from the calibration surface 120. In an example, the sensor 112 may determine the distance 114 using the number of photons transmitted by sensor 112 and the number of photons received by sensor 112 integrated over a period of time. In an example, the sensor 112 may determine the distance 114 using an outgoing beam transmitted by the optical transmitter 113 of photons modulated with a radio frequency carrier and then measuring the phase shift of that carrier when received by the receiver 115 of the sensor 112 after reflection from the calibration surface 120. In an example, the sensor 112 may determine the distance 114 using a range gated imager that opens and closes at the same rate as the photons set out. In the range gated imager, a part of the returning photons are blocked according to time of arrival. Thus, the number of photons received relates to the distance traveled by the photons. The distance traveled can be calculated using the formula, $z=R(S_2-S_1)/2(S_1+S_2)+R/2$, where R is the sensor range, determined by the round trip of the light pulse, $S_1$ is the amount of light pulse that is received, and $S_2$ is the amount of the light pulse that is blocked. In an example, the sensor 112 may measure the direct time of flight for a single laser pulse to leave the sensor 112 and reflect back onto a focal plane array of the sensor 112. The sensor 112 may use InGaAs avalanche photo diode or photodetector arrays capable of imaging laser pulse in the 980 to 1600 nm wavelengths. In an example, sensor 112 may include an illumination unit for illuminating the scene, an optical unit to gather the reflected light, an image sensor where a pixel measures the time the light has taken to travel from the illumination unit to the object and back to the focal plane array and driver electronics. In an example, the illumination unit may include a laser diode or an infrared led. In an example, the optical unit of sensor 112 may include an optical band-pass filter to pass light with the same wavelength as the illumination unit to suppress nonpertinent light and reduce noise of the light received. In an example, sensor 112 may include an ambient light sensor to determine a signal to noise ratio, between the light received by the sensor 112 which was transmitted from sensor 112 and the light received by the sensor 112 which is ambient light.

In an example, the controller 104 may include data storage 130. The data storage 130 may store at least one of the distance 114, the expected calibration distance 124, the validation distance 116, the corrected validation distance 118, expected validation distance 142, threshold 128 and sensor offset 126.

Figure 2A:
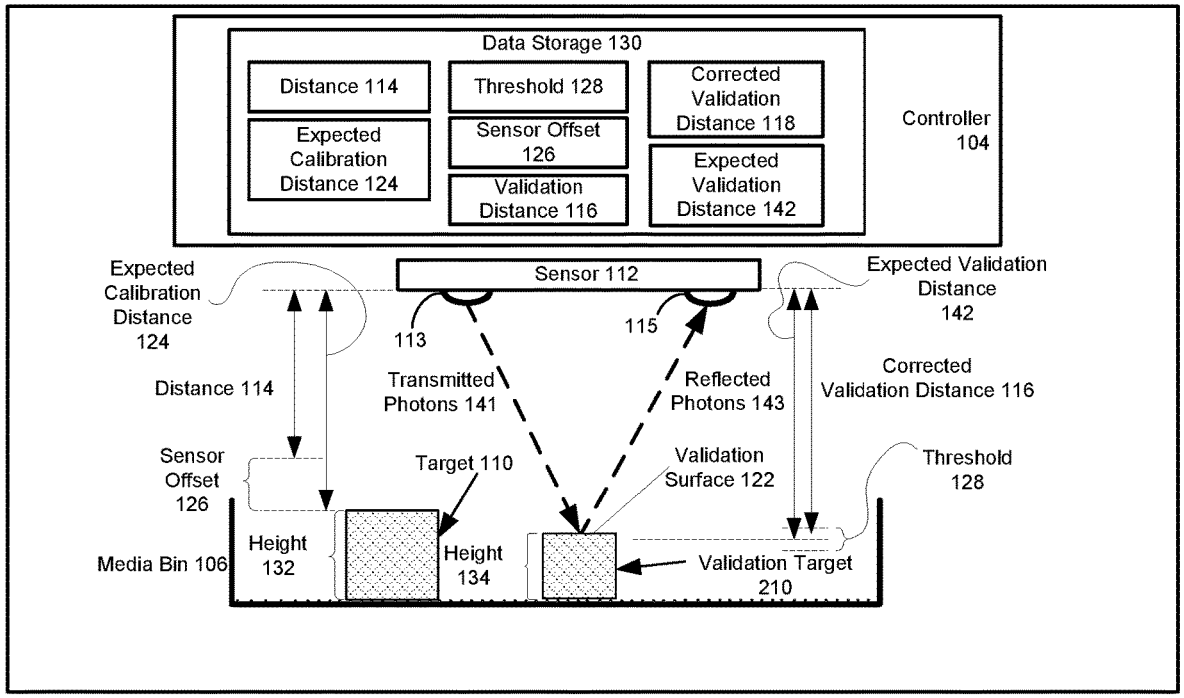

With reference to FIG. 2A, the figure shows an example of the present disclosure whereby the sensor 112 may be calibrated using a target 110 and verified with the validation target 210 distinct from the target 110. In an example, the controller 104 may use the target 110 with the calibration surface 120, to determine the sensor offset 126. The calibration surface 120 may be located at the height 132 above the opposing surface 108 of the media bin 106. In an example, the calibration may be verified using a validation target 210, with the validation surface 122. The validation surface 122 may be located at the height 134 above the opposing surface 108 of the media bin 106. In an example, the target 110 and the validation target 210 may be used in a production assembly in series to calibrate sensor 112. In another example, the target 110 and/or the validation target 210 may be cubes with equal sides and faces at right angles. In another example, the target 110 and/or the validation target 210 may be cuboids with sides of different dimensions and faces at right angles. In an example, the opposing surface 108 of the media bin 106 may have grooves, designated area, etc. to position the target 110 and/or the validation target 210 during calibration. In an example, the media bin 106 may be laterally translatable and the target 110 and/or validation target 210 may be laterally translated to position them for calibration and/or verification. In another example, the target 110 and/or validation target 210 may be integrated into the media bin 106. The calibration surface 120 and/or validation surface 122 may be flush with the opposing surface 108 of the media bin 106, when the apparatus is not being calibrated. During calibration the target 110 and/or the validation target 210 may be raised. In an example, the calibration surface 120 may be raised to the height 132 and/or the validation surface may be raised to the height 134 above the opposing surface 108.

Figure 2B:
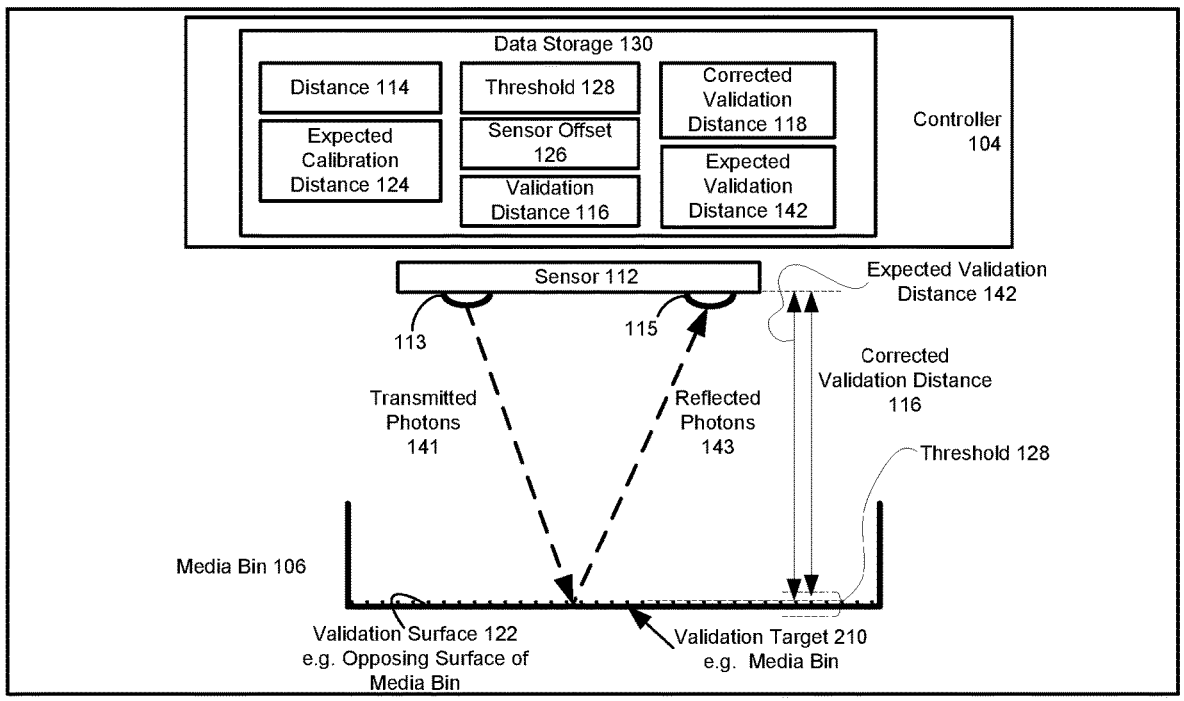

With reference to FIG. 2B, the figure shows an example of the present disclosure whereby the sensor 112 may be calibrated using a target 110 to determine the sensor offset 112 and the calibration of the sensor 112 verified using the opposing surface 108 of the media bin 106 as the validation surface 122. In another example, the controller 104 may use the opposing surface 108 of the media bin 106 as the calibration surface 120 to determine the sensor offset 112 and the calibration of the sensor 112 may be verified using the validation target 210, with the validation surface 122.

Figure 3A:
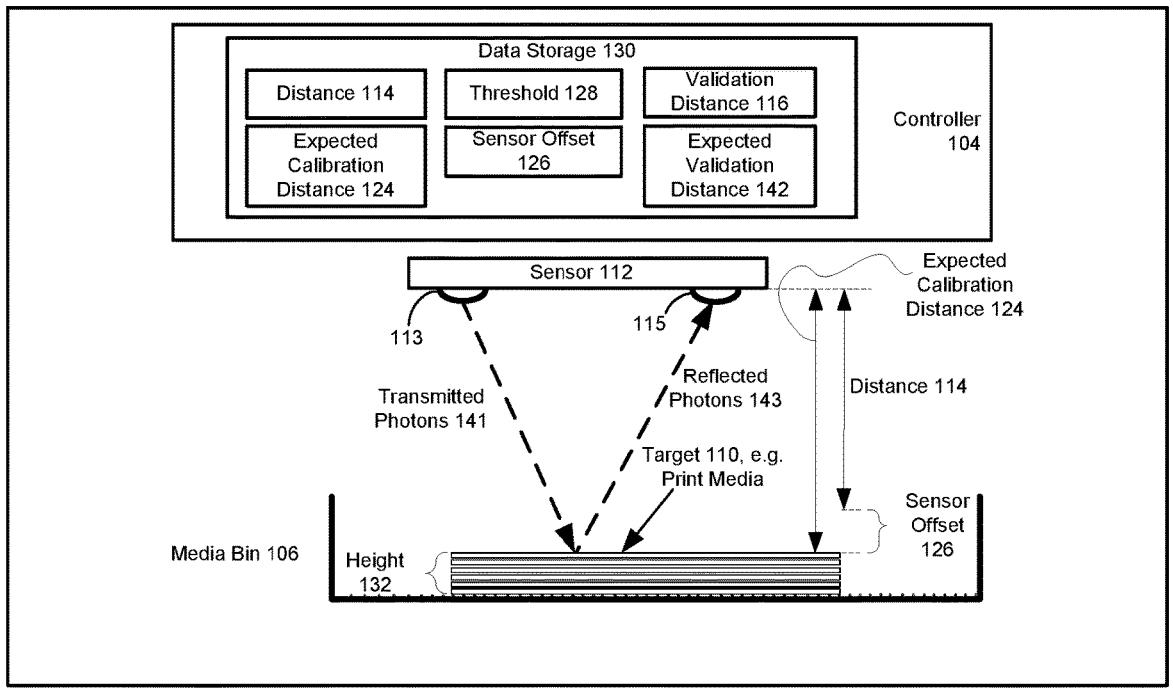

With reference to FIG. 3A, the figure shows an example of the present disclosure whereby the sensor 112 may be calibrated using a stack of media sheets, such as print media of a known dimension, such as known height. For example, FIG. 3A shows the print media of height 132 being used as a target 110, with a calibration surface 120 to determine the sensor offset 126. In an example, the calibration of the sensor 112 may be verified using the opposing surface 108 of the media bin 106.

Figure 3B:
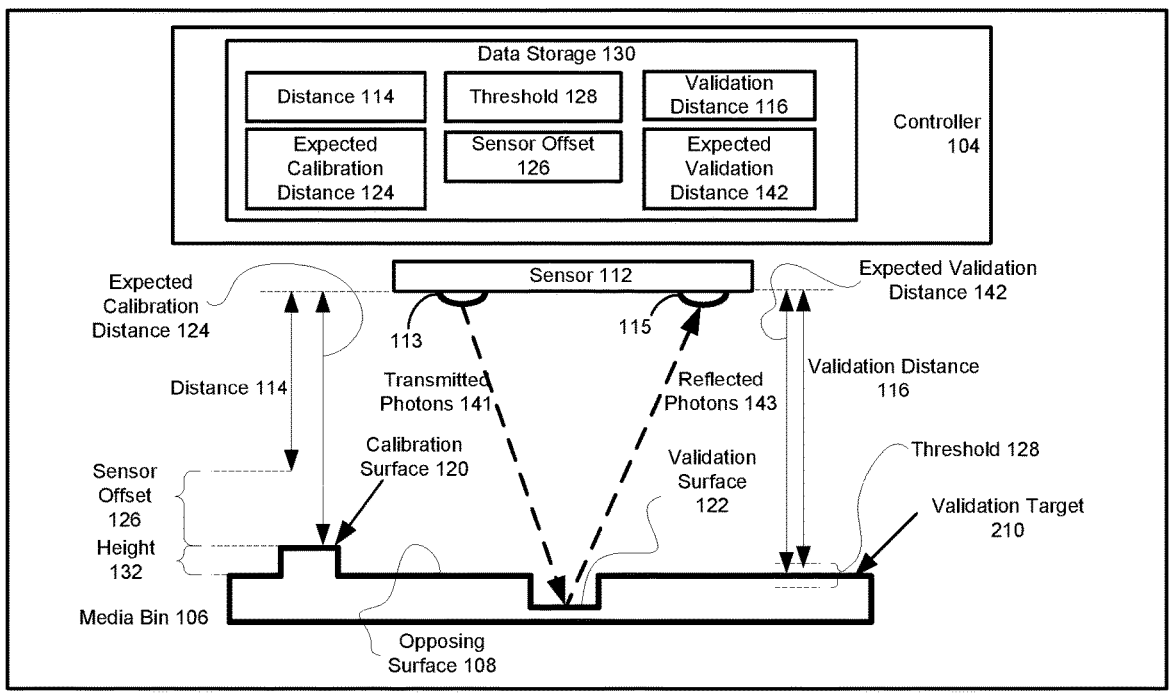

With reference to FIG. 3B, the figure shows an example of the present disclosure whereby the sensor 112 may be calibrated using a calibration surface 120 located on the media bin 106, located at the height of 132 above the media bin 106. For example, FIG. 3B shows the calibration surface 120 on a media bin 106 for determining the sensor offset 126. In another example, the validation surface 122 may be located in a groove on the opposing surface 108 of the media bin. In another example, the validation surface 122 may be located on the opposing surface 108 of the media bin. In an example, the validation surface 122 may be located where the calibration surface 120 is shown in FIG. 3b. In an example, the calibration surface 120 may be located where the validation surface 122 is shown in FIG. 3b. In another example, the opposing surface 108 of the media bin 106 may be used as the calibrating calibration surface 120.

In an example, the calibration surface 120 and/or the validation surface 122 may include a mirror layer such as 3M™ daylighting film, a carbon black layer, replaceable layers, or painted layers or a coating to reflect photons to the sensor 112.

In an example, the controller 104 may determine the minimum effective value of the sensor 112 using the number of printed sheets, and calculating the distance 114 as each sheet is printed. When the distance 114 is determined to be different from the distance 116 as each sheet printed, that distance is the minimum effective value of the sensor 112.

Figure 4A:
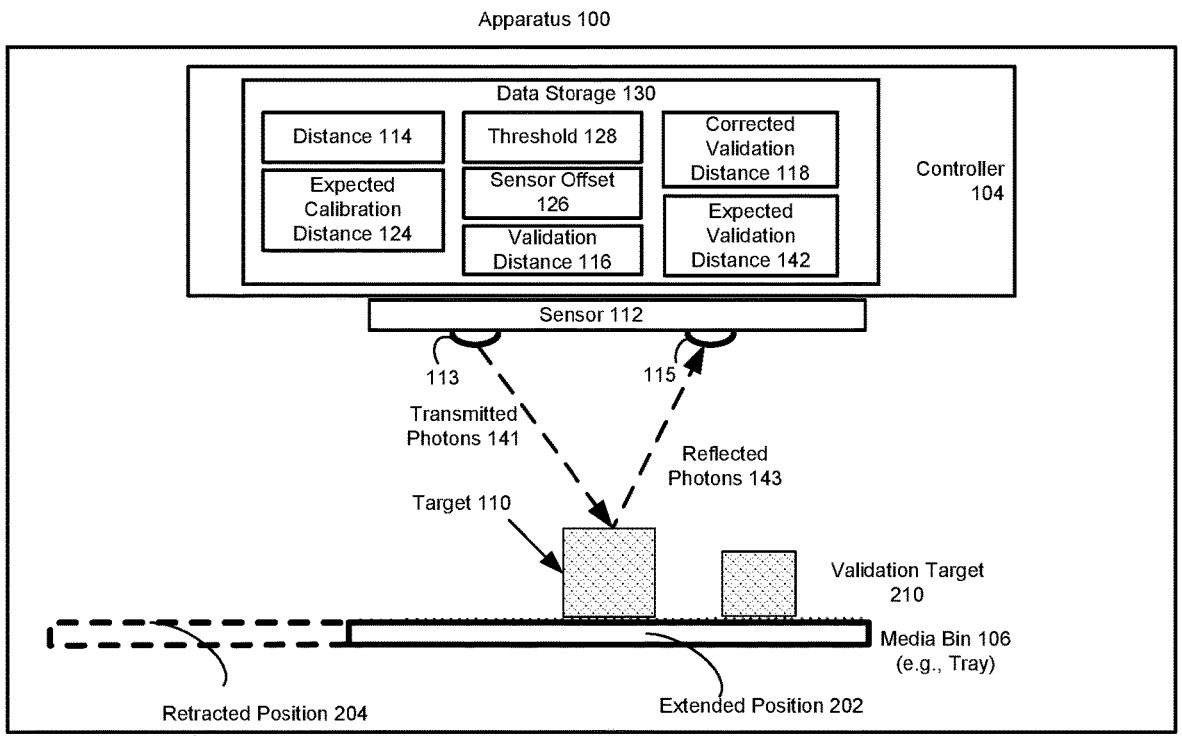
Figure 4B:
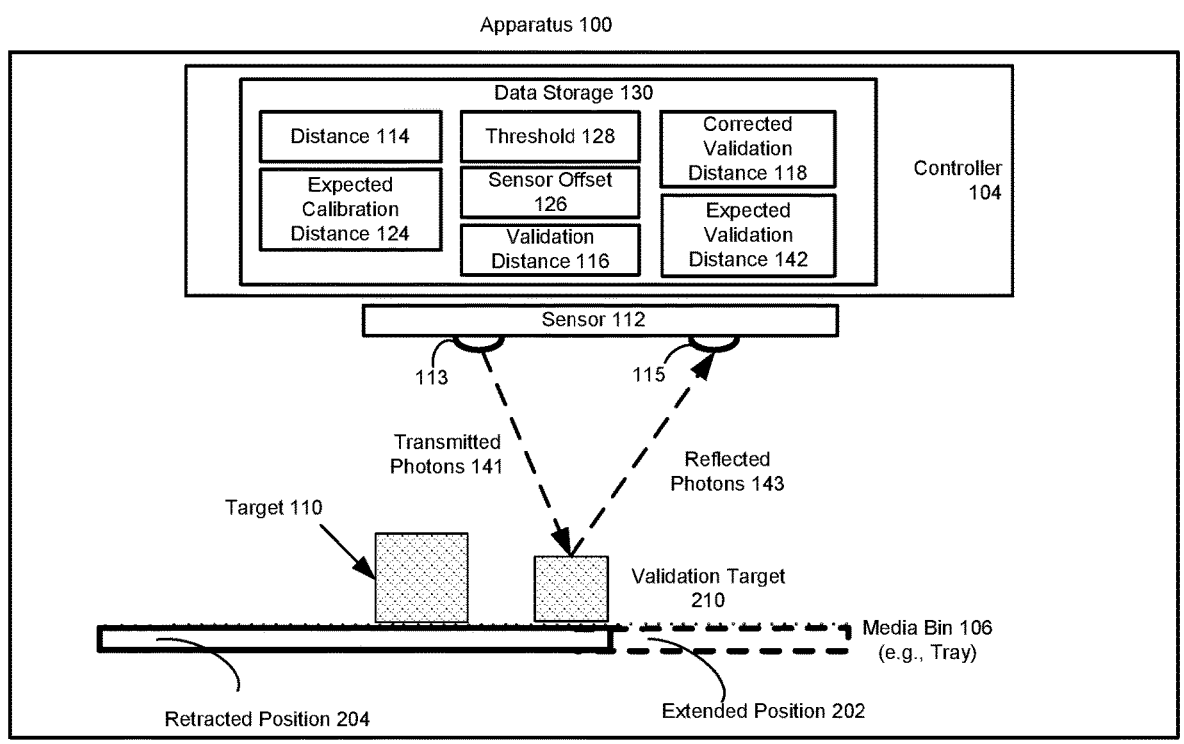

With reference to FIG. 4A and FIG. 4B, the media bin 106 may be laterally translatable between an extended position 202 and a retraced position 202. For example, FIG. 2A shows the media bin 106 in the extended position 202. The media bin 106 may be a finisher tray and may be laterally translated between the extended position 202 and retraced position 204. In an example, the media bin 106 may be translated laterally until the sensor locates the target 110, with the calibration surface 120 to determine a sensor offset 126. In an example, the media bin 106 may be translated laterally until the sensor locates the validation target 210. The controller 104 may verify the calibration of sensor 112 as discussed hereinabove.

Figure 5A:
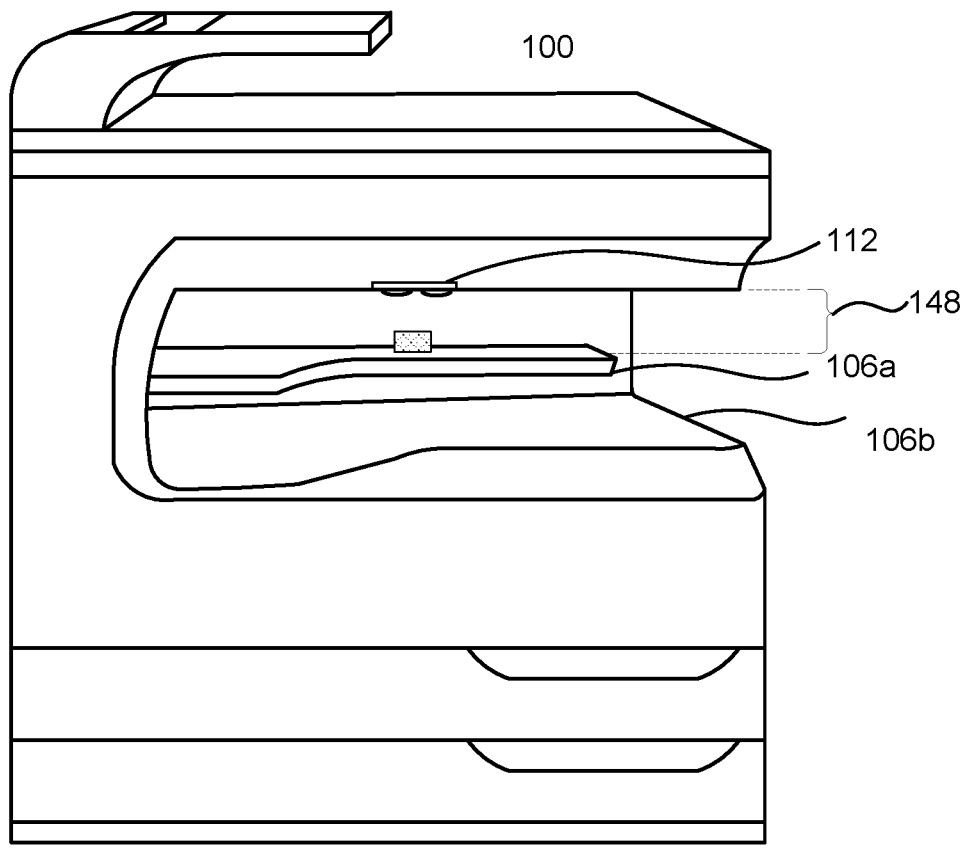
FIGS. 5A, 5C and 5D shows side views of an example printing apparatus with a laterally translating media bin.
Figure 5B:
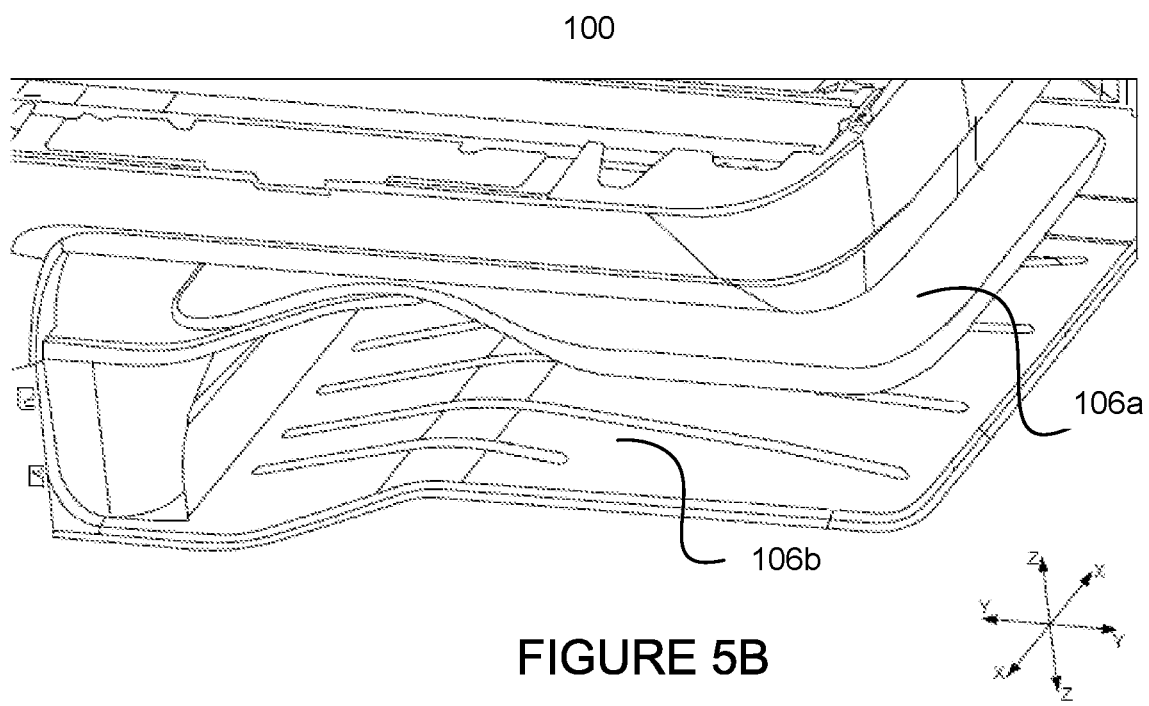
FIG. 5B shows an isometric view of an example printing assembly of the printing apparatus shown in FIG. 5A with a translating media bin.
Figure 5C:
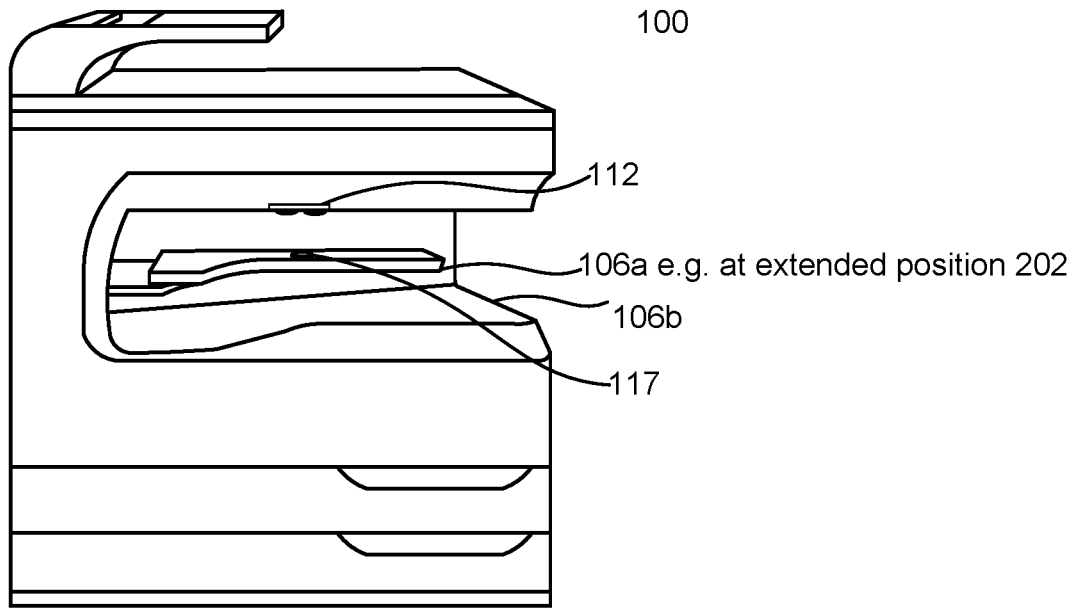
Figure 5D:
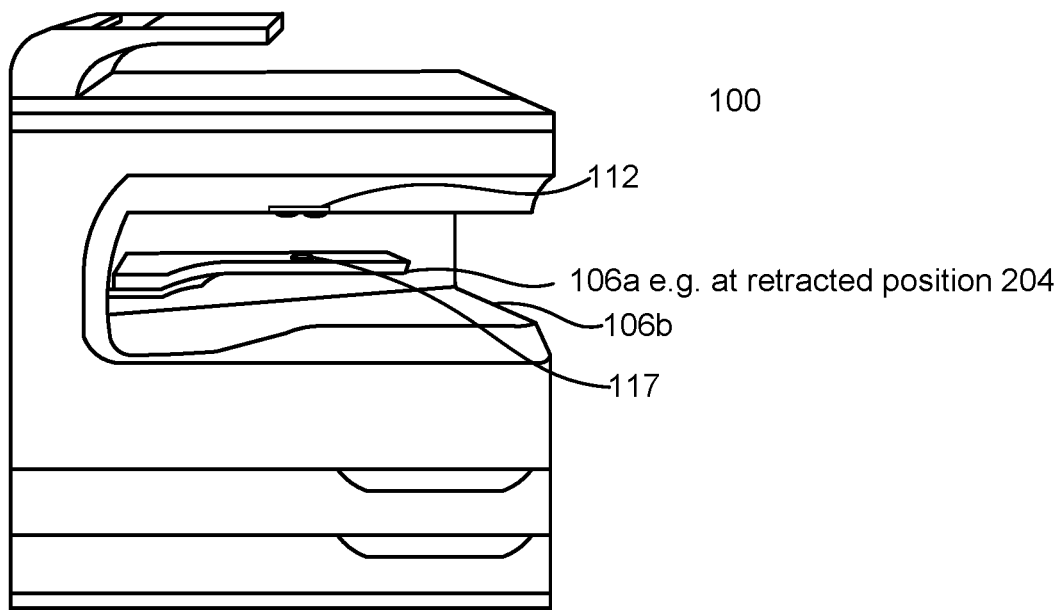

FIGS. 5A, 5C and 5D are side views of the printing apparatus 100, according to an example. FIG. 5B is an isometric view of the printing apparatus 100, according to an example. FIG. 5A shows two media bins, labeled 106a and 106b. The media bin 106a may be located at the opposing distance 148 from the sensor 112. In an example, with reference to FIGS. 4A, 4B, 5C and 5D the media bin 106a may translate from the extended position 202 to the retracted position 204 along the Y-Y axis of FIG. 5B. In another example, with reference to FIG. 5B the media bin 106a may translate along the X-X axis of FIG. 3B. In another example, with reference to FIG. 5B the media bin 106a may translate along the X-X axis of FIG. 5B. In another example, with reference to FIG. 5B the media bin 106a may translate along a combination of X-X and Y-Y axis of FIG. 5B. In an example, the media bin 106a may hold the print media 152 after printing.

Figure 6:
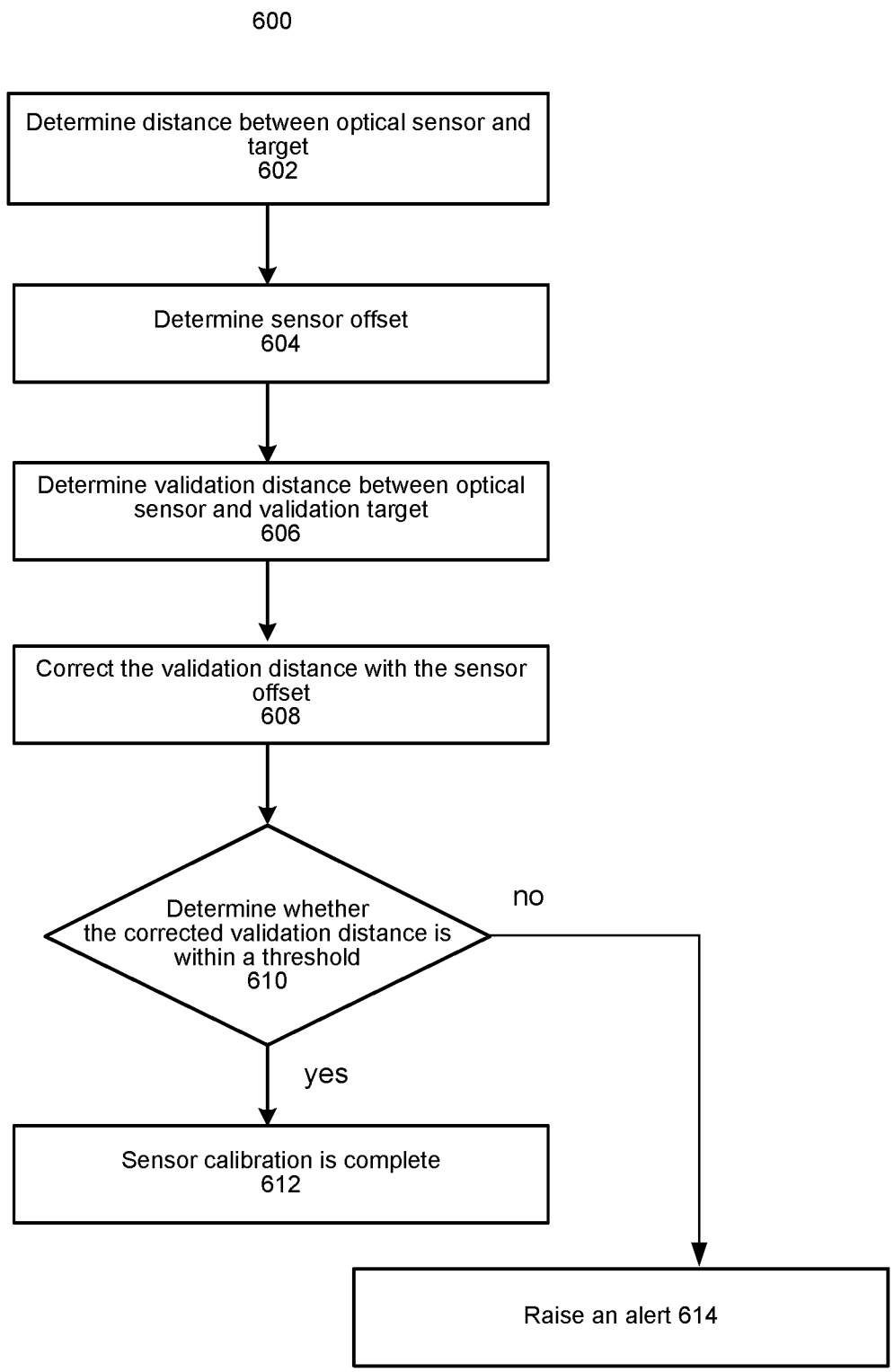
FIG. 6 shows an example flow chart of an example method, according to an example of the present disclosure.

FIG. 6 shows an example of a method 600. The method 600 may be performed by the apparatus 100 to calibrate the sensor 112. The method 600 is described by way of example as being performed by the apparatus 100, and may be performed by other apparatus. The method 600 and other methods described herein may be performed by any printing apparatus or any media bin apparatus including at least one processor executing machine readable instructions embodying the method. For example, the apparatus 100 and/or the controller 104 shown in FIG. 1 may store machine readable instructions in the data storage 130 embodying the methods, and a processor in the controller 104 may execute the machine readable instructions. Also, one or more of the steps of the method 600 and steps of other methods described herein may be performed in a different order than shown or substantially simultaneously.

At 602, the apparatus 100 measures the distance 114 between the sensor 112 and the calibration surface 120 facing the sensor 112. In an example, the controller 104 may calculate the distance 114 based on the time taken by photons transmitted from the sensor 112 and received by the sensor 112 after the photons are reflected from the calibration surface 120. In an example, the controller 104 may repeat the distance measurement n times, where n is an integer, such that n>=1 and determine an average to calculate the distance 114.

At 604, the apparatus 100 may determine the sensor offset 126. In an example, the sensor offset 126 may be the difference between the expected calibration distance 124 and the distance 114.

At 606, the apparatus 100 measures the validation distance 116 between the sensor 112 and the validation surface 122 facing the sensor 112. In an example, as discussed above distance may be calculated based on time of flight of photons. In an example, the controller 104 may repeat the distance measurement n times, where m is an integer, such that m>=1 and determine an average to calculate the distance 114. In an example, m and n may be equal. In another example, m and n may be different.

At 608, the apparatus 100 may correct the validation distance 116 using the sensor offset 126. In an example, the sensor offset 126 may be stored in a register of the sensor 112 to correct the distances measured by the sensor 112. In another example, the sensor offset 126 may be used by the controller 104 to determine the corrected measurement.

At 610, the controller determines whether the corrected validation distance 118 is within the threshold 128. As discussed above with reference to FIG. 1B, the threshold 128 may be based on the expected validation distance 142. In response to a determination that the corrected validation distance 118 is within the threshold 128, execution moves to 612. In response to a determination that the corrected validation distance 118 is outside the threshold 128 execution moves to 614. For example, the threshold is 98% to 102% of the expected validation distance 142 and the corrected validation distance 118 is within the threshold when the value is within 98% to 102% of the expected validation distance 142 and outside the threshold when the value is outside 98% to 102% of the expected validation distance 142.

At 614, the controller 104 may determine that the sensor calibration is complete and store the sensor offset 126 for measuring distances after calibration. In an example, the controller 104 may store the sensor offset 126 to the sensor 112, in a register on the sensor 112.

At 614, the apparatus 100 may raise an alert. As discussed above, in an example, the alert may indicate a misaligned component of the apparatus 100. In another example, the alert may indicate the sensor 112 is damaged. In another example, the alert may indicate the sensor 112 needs to be cleaned to remove dust such as paper dust.

Figure 7:
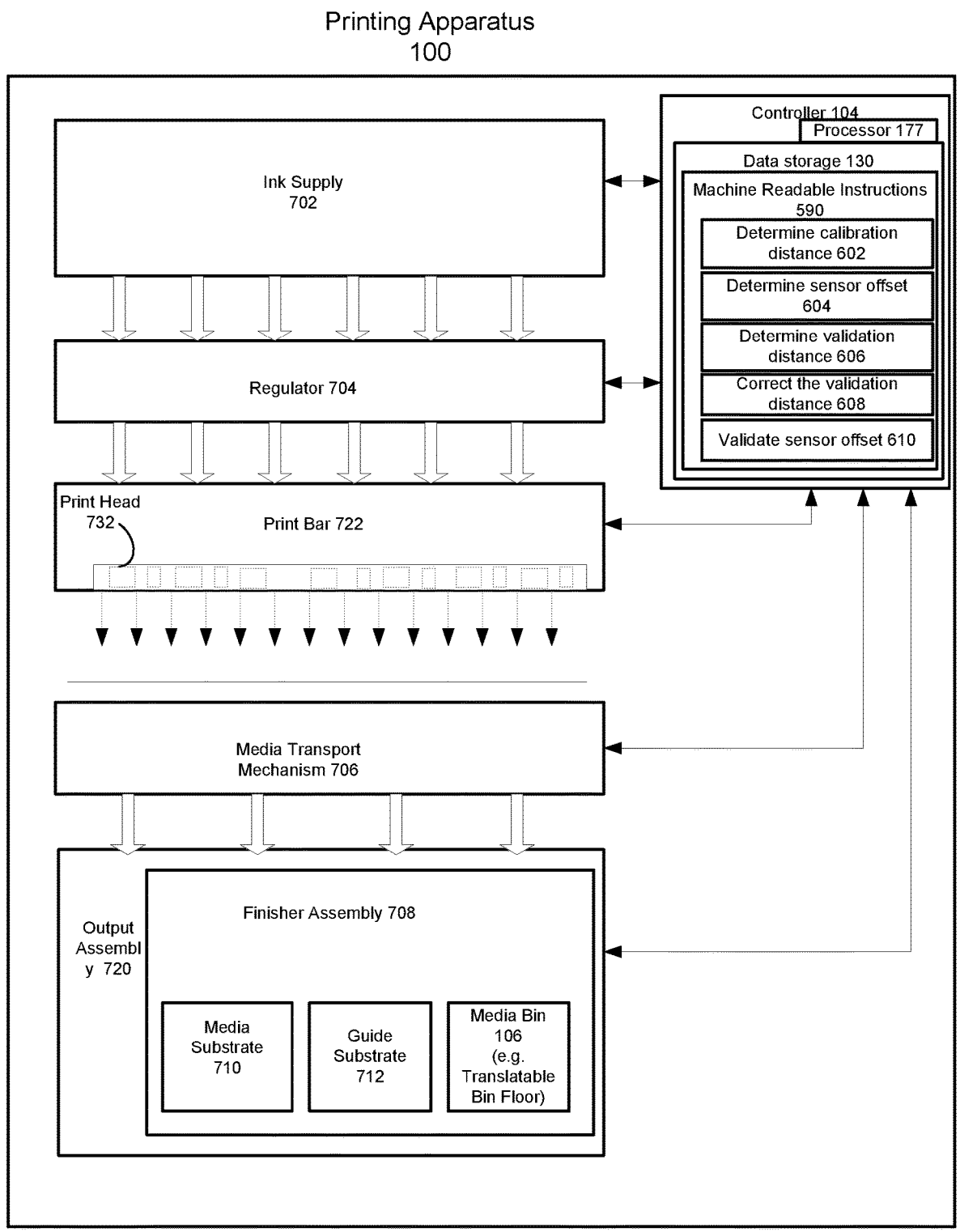
FIG. 7 shows components that may be used in the example printing apparatuses described herein

FIG. 7 shows a block diagram of the printing apparatus 100 including the media bin 106, according to an example of the present disclosure. The apparatus 100 includes the media bin 106 to receive the print media 152. In an example, the apparatus 100 may receive a number of stacks of the print media 152. In another example, the apparatus 100 may include a print bar 722 that spans the width of the print media 152. In another example, the apparatus 100 may include non-page wide array print heads. The apparatus 100 may further include flow regulators 704 associated with the print bar 722, a media transport mechanism 706, printing fluid or other ejection fluid supplies 702, and the controller 104. Although a 2D printing apparatus is described herein and depicted in the accompanying figures, aspects of the examples described herein may be applied in a 3D printing apparatus.

The controller 104 may represent the machine readable instructions 590, processor(s) 177, associated data storage device(s) 130, and the electronic circuitry and components used to control the operative elements of the apparatus 100 including the firing and the operation of print heads 532, including the print bar 522. The controller 104 is hardware such as an integrated circuit, e.g., a microprocessor. In other examples, the controller 104 may include an application-specific integrated circuit, field programmable gate arrays or other types of integrated circuits designed to perform specific tasks. The controller 110 may include a single controller or multiple controllers. The data storage 130 may include memory and/or other types of volatile or nonvolatile data storage devices. The data storage 130 may include a non-transitory computer readable medium storing machine readable instructions 590 that are executable by the controller 104. Further, the controller 104 controls the media transport mechanism 506 used to transport media through the apparatus 100 during printing and to transport the print media 110 to the media bin 106. In an example, the controller 104 may control a number of functions of the media bin 106. In one example, the controller 104 may control a number of functions of the media bin 106 in presenting the print media 110 to a media bin 106 such as a translatable bin floor. Further, the controller 104 controls functions of a finisher assembly 508 to translate a number of stacks of the print media 110 between a number of different locations within the output area.

The media transport mechanism 706 may transport the print media 152 from the media bin (not shown in figure) for feeding paper into the printing apparatus 100 to the output assembly 720 used for collection, registration and/or finishing of the print media 152. In an example, the print media 152 collected on the output assembly 720 includes at least one of the print media 152 having text and/or images produced. In an example, a completed collection of the print media 152 may represent a print job that the apparatus 100 processes.

In an example, the controller 104 may retrieve the machine readable instructions 590 from the data storage 130 to execute the instructions. At 602, the controller 104 may determine the distance 114 using the sensor 112. At 602, the controller 104 may the use the distance 114 and the expected calibration distance 124 to calculate the sensor offset 126. At 606, the controller 104 may measure the validation distance 116. At 608, the controller 104 may correct the validation distance 116 using the sensor offset 126. At 608, controller 104 may validate the sensor offset 610. After calibration, controller 104 may then calculate the distance to the bottom surface of the output assembly such as the media bin 106, which is part of the finisher assembly 708.

The apparatus 100 may be any type of device that reproduces an image onto the print media 152. In one example, the apparatus 100 may be an inkjet printing device, laser printing device, a toner based printing device, a solid ink printing device, a dye-sublimation printing device, among others. Although the present printing apparatus 100 is describe herein as an inkjet printing device, any type of printing apparatus may be used in connection with the described systems, devices, and methods described herein. Consequently, an inkjet printing apparatus 100 as described in connection with the present specification is meant to be understood as an example and is not meant to be limiting.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a media bin;
an optical sensor to transmit photons toward the media bin;
a controller to:
determine a distance between a calibration surface of a target placed on the media bin and the optical sensor;
determine a sensor offset from a difference between the determined distance and an expected calibration distance;
determine a validation distance between a validation surface facing the optical sensor and the optical sensor;
correct the validation distance with the sensor offset; and
validate the sensor offset when the corrected validation distance is within a threshold, wherein the threshold is based on an expected validation distance between the validation surface and the optical sensor.

2. The apparatus of claim 1, wherein the validation surface is on a validation target placed on the media bin.

3. The apparatus of claim 1, wherein the validation surface is a bottom surface of the media bin facing the sensor.

4. The apparatus of claim 1, wherein the validation surface is on the target placed on the media bin.

5. The apparatus of claim 1, wherein the target is a cube.

6. The apparatus of claim 1, wherein the target is a cuboid.

7. The apparatus of claim 6, wherein the cuboid has the calibration surface on a first side and the validation surface on a second side.

8. The apparatus of claim 1, wherein the target is a stack of print media of known dimensions.

9. The apparatus of claim 1, wherein the target is a surface on the media bin disposed on the same plane as the validation surface on the media bin, the target and the validation surface are located at different distances from the sensor.

10. The apparatus of claim 1, wherein the distance between the calibration surface and the sensor is determined based on a time of flight of photons transmitted from the optical sensor and reflected back to the optical sensor after being reflected from the calibration surface.

11. A method comprising:
determining a distance between an optical sensor and a surface of a target placed on a media bin facing the optical sensor, wherein the distance is calculated as an average of n measurements, where n is an integer greater than or equal to one;
determining a sensor offset of the optical sensor based on the distance, wherein the sensor offset is a difference between the distance determined and an expected distance;
determining a validation distance between the optical sensor and a validation surface of the target placed on the media bin, wherein the distance is calculated as an average of m measurements, where m is an integer greater than or equal to one;
correcting the validation distance with the sensor offset; and
validating the sensor offset of the optical sensor when the corrected validation distance is within a threshold.

12. The method according to claim 11, wherein the distance between the optical sensor and the target is determined based on number of photons transmitted and reflected back at the sensor per unit time.

13. The method according to claim 11, wherein the expected distance is based on a dimension of the target.

14. The method according to claim 11, wherein the threshold is based on a dimension of the target.

15. The method according to claim 11, wherein an alert is raised when the corrected validation distance is outside the threshold.

* * * * *